United States Patent [19]

Weiss

[11] 4,156,896
[45] May 29, 1979

[54] METHOD OF CONTROLLING A POWER CONVERSION SYSTEM

[75] Inventor: Herbert W. Weiss, Salem, Va.

[73] Assignee: General Electric Company, Salem, Va.

[21] Appl. No.: 894,970

[22] Filed: Apr. 10, 1978

[51] Int. Cl.² ............... H02P 13/24; H02M 7/155
[52] U.S. Cl. ................................. 363/87; 363/96; 363/129
[58] Field of Search ............ 363/85, 86, 87, 128, 363/129, 130, 41, 42, 43, 52, 53, 54, 96; 318/345 C, 345 G

[56] References Cited

U.S. PATENT DOCUMENTS

| 3,392,319 | 7/1968 | McColl et al. | 363/129 |
| 3,421,071 | 1/1969 | Cassel | 363/45 X |
| 3,424,970 | 1/1969 | Ross | 363/87 X |
| 3,447,061 | 5/1969 | Russell et al. | 363/87 |
| 3,775,663 | 11/1973 | Turnbull | 363/41 |

Primary Examiner—William M. Shoop
Assistant Examiner—Peter S. Wong
Attorney, Agent, or Firm—Arnold E. Renner

[57] ABSTRACT

A method of controlling the thyristors of an a.c. to d.c. bridge converter, having neutral connected thyristors, at relatively low power levels by gating each phase leg thyristor conductive for a predetermined minimum period within the electrical separation between adjacent line to neutral phase voltages and immediately gating the respective neutral leg thyristor conductive for the remainder of the period such that there are no intervals in the cycle when both neutral leg thyristors are in conduction. In a three phase bridge converter system, this requires at least 60 electrical degrees minimum conduction for each phase leg thyristor followed by a 60° conduction of the neutral leg thyristors. In any event, the sum of the phase leg conduction and the neutral leg conductions is always equal to 120° in a three phase system. This control method improves the response to a reverse command voltage by assuring that a phase leg thyristor is conductive, thus making a transition from the first to fourth quadrant operation at maximum possible speed.

8 Claims, 19 Drawing Figures

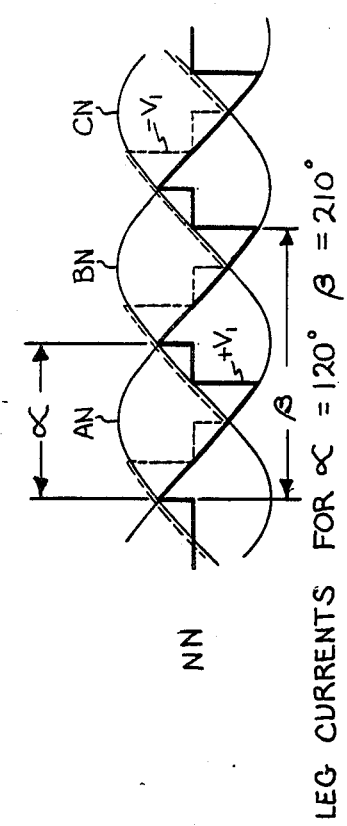
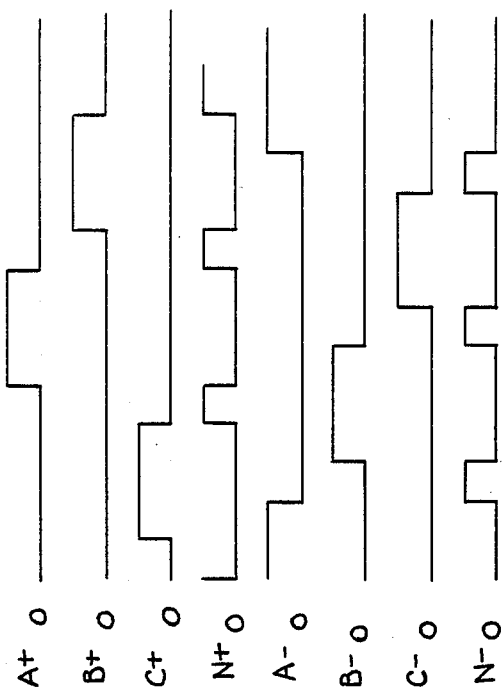
FIG.3

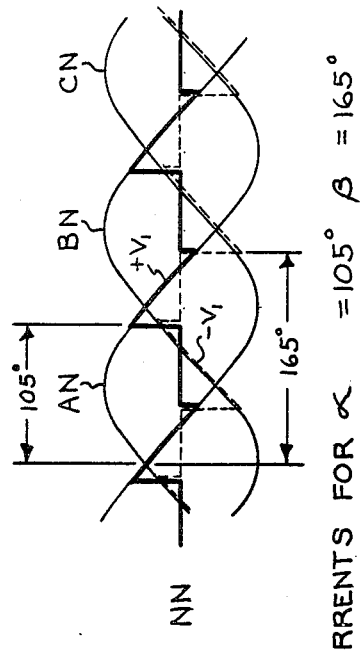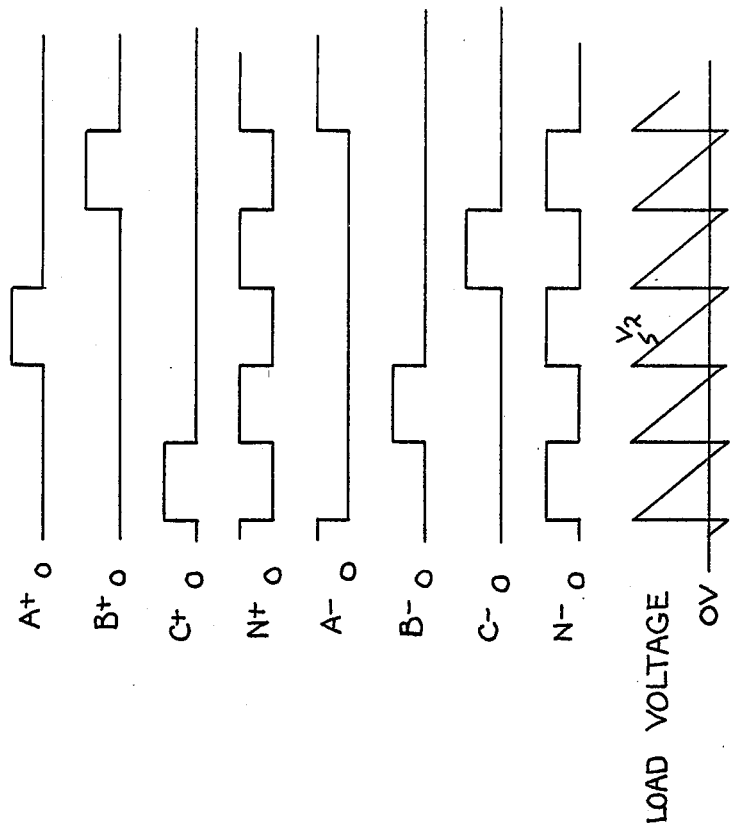
FIG.5B
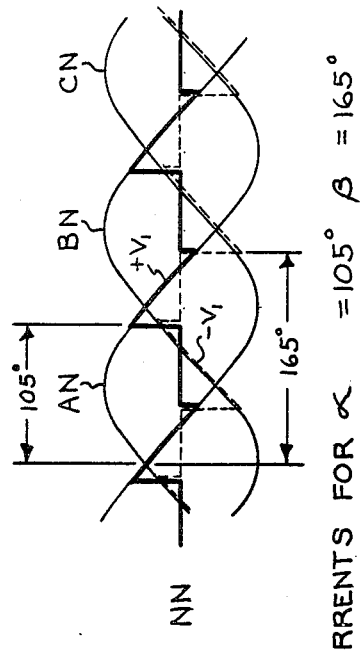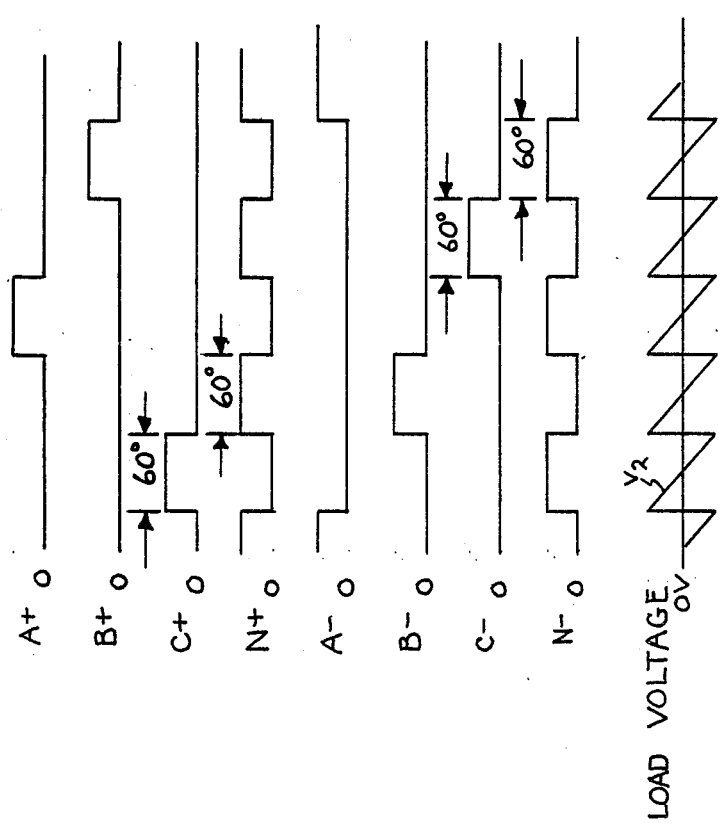
**FIG.5A

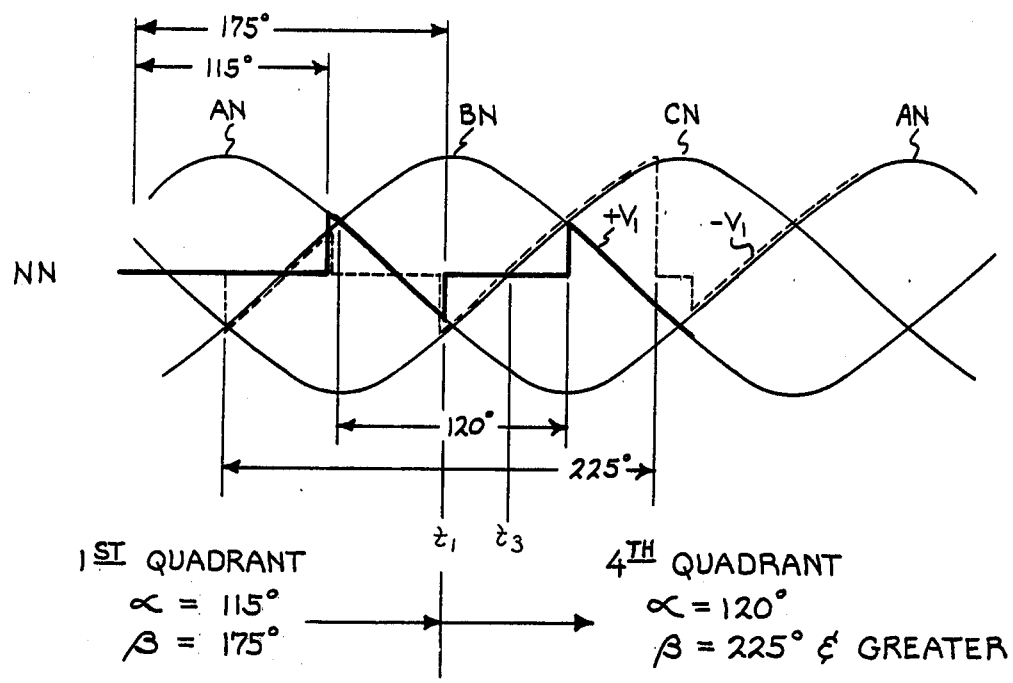
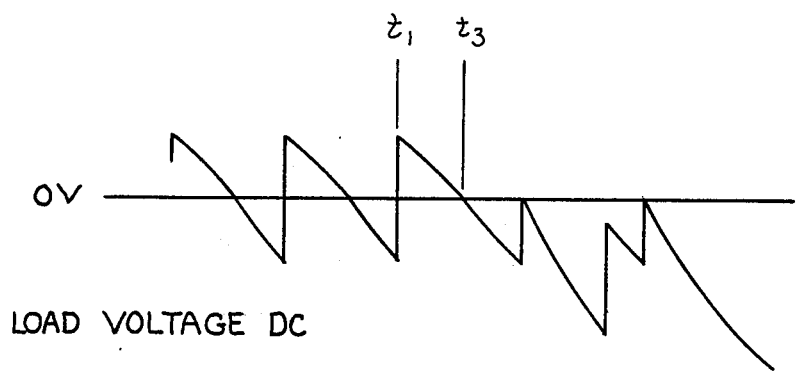
LOAD VOLTAGE DC
FIG. 6

METHOD OF CONTROLLING A POWER CONVERSION SYSTEM

CROSS REFERENCE TO RELATED APPLICATION

This application is related to U.S. Pat. application Ser. No. 895,188 entitled "Control Circuit For Power Converter", filed on Apr. 10, 1978, in the names of Loren H. Walker and Paul M. Espelage, which application is also assigned to the present assignee.

BACKGROUND OF THE INVENTION

The present invention relates generally to static power conversion systems and their method of operation, and more particularly to a method for improving the response of a converter system having neutral thyristors.

Power conversion systems and their method of operation for supplying a d.c. load from an a.c. source is well known. It is also known that these systems are adapted to control the magnitude of the output d.c. voltage and have the ability to operate in more than one quadrant, a six pulse bridge converter being a typical example. Such a circuit, however, is characterized by a relatively high ripple content in the load voltage at low output voltage. The power factor of this arrangement is also known to be relatively poor at lower output voltages.

When the load is inductive and the load current tends to be continuous, as is the case for a motor load, it is also known that the addition of a free-wheeling diode configuration will reduce load voltage ripple and to improve the power factor at lower output voltages. Such converters as these, however, do not permit fourth quadrant operation and the degree of control remains limited. These principles as well as others relating to known a.c. to d.c. power conversion systems are set forth in detail in *Thyristor Phase-Controlled Converters and Cycloconverters*, by B. R. Pelly, Copyright 1971 by John Wiley and Sons, Inc. (Library of Congress Catalogue No. 70-125 276) and reference to this work can be made when desirable for a more exhaustive treatment. It is also known that the input power factor of a six pulse phase controlled thyristor bridge converter supplying an inductive load can be improved at low voltage operation by adding two additional thyristors which are connected from the positive and negative bus connected across the load to the neutral point of the a.c. system. Such a configuration as well as the basic circuit concepts are set forth in the now abandoned U.S. patent application, U.S. Ser. No. 748,281, now abandoned, entitled "Power Conversion System and Method of Control", filed on Dec. 7, 1976, by the assignee of the present invention, in the name of David L. LaFuze, which application is specifically incorporated herein by reference.

As will be shown hereinafter, when reference to the drawings in this application is made, when a bridge converter such as disclosed in the LaFuze application, Ser. No. 748,281 is operating at a low d.c. output voltage and with continuous current in the first quadrant, there are intervals in the cycle when the respective thyristors in both neutral legs are in conduction. Flat spots indicative of zero output voltage appear on the d.c. output voltage waveform since the a.c. power system is being by-passed in this operating mode and as a result a transport lag or time delay will exist during voltage reversal as the system makes a transition from first to fourth quadrant operation.

SUMMARY OF THE INVENTION

The present invention is directed to an improved method of operating a bridge converter utilizing controlled rectifiers.

It is therefore an object of the present invention to provide a method of controlling the transfer of power between a polyphase power source and a load.

It is a further object to provide a method of improved power converter operation in a continuous current system operating at relatively low power levels.

Still a further object is to provide a method of a.c. to d.c. power converter operation which is adapted to improve system response during voltage reversal when operating in a continuous current mode at relatively low power levels.

The foregoing and other objects are achieved in accordance with the present invention by the method of controlling the power supplied to a load from a polyphase (three phase) a.c. power source by selectively controlling the conduction periods of the thyristors forming a bridge converter including neutral thyristors. The operational method of the subject invention comprises rendering each thyristor in the phase legs successively conductive for at least one half of the period of the electrical phase displacement between line to neutral phase voltages followed by an immediate conduction period of the controlled rectifier of the respective neutral leg for the remainder of the period. In a three phase system, each controlled rectifier of the phase leg is rendered conductive for at least 60 electrical degrees followed by an immediate conduction period of the associated neutral leg controlled rectifier for the remainder of the 120° period. This operation prevents simultaneous conduction of the controlled rectifiers in the positive and negative neutral legs.

BRIEF DESCRIPTION OF THE DRAWINGS

While the present invention is described in particularity in claims annexed to and forming a part of the specification, a better understanding of the invention can be had by reference to the following description taken in conjunction with the accompanying drawings in which:

FIG. 3 is a set of waveforms illustrative of prior art operation in the fourth quadrant;

FIGS. 5A and 5B are a set of waveforms illlustrative of a desired method of operation of the subject invention;

FIG. 6 is a set of waveforms illustrative of the response characteristic to reverse voltage commands in accordance with the method set forth in FIGS. 5A and 5B;

DETAILED DESCRIPTION

Figure 1:
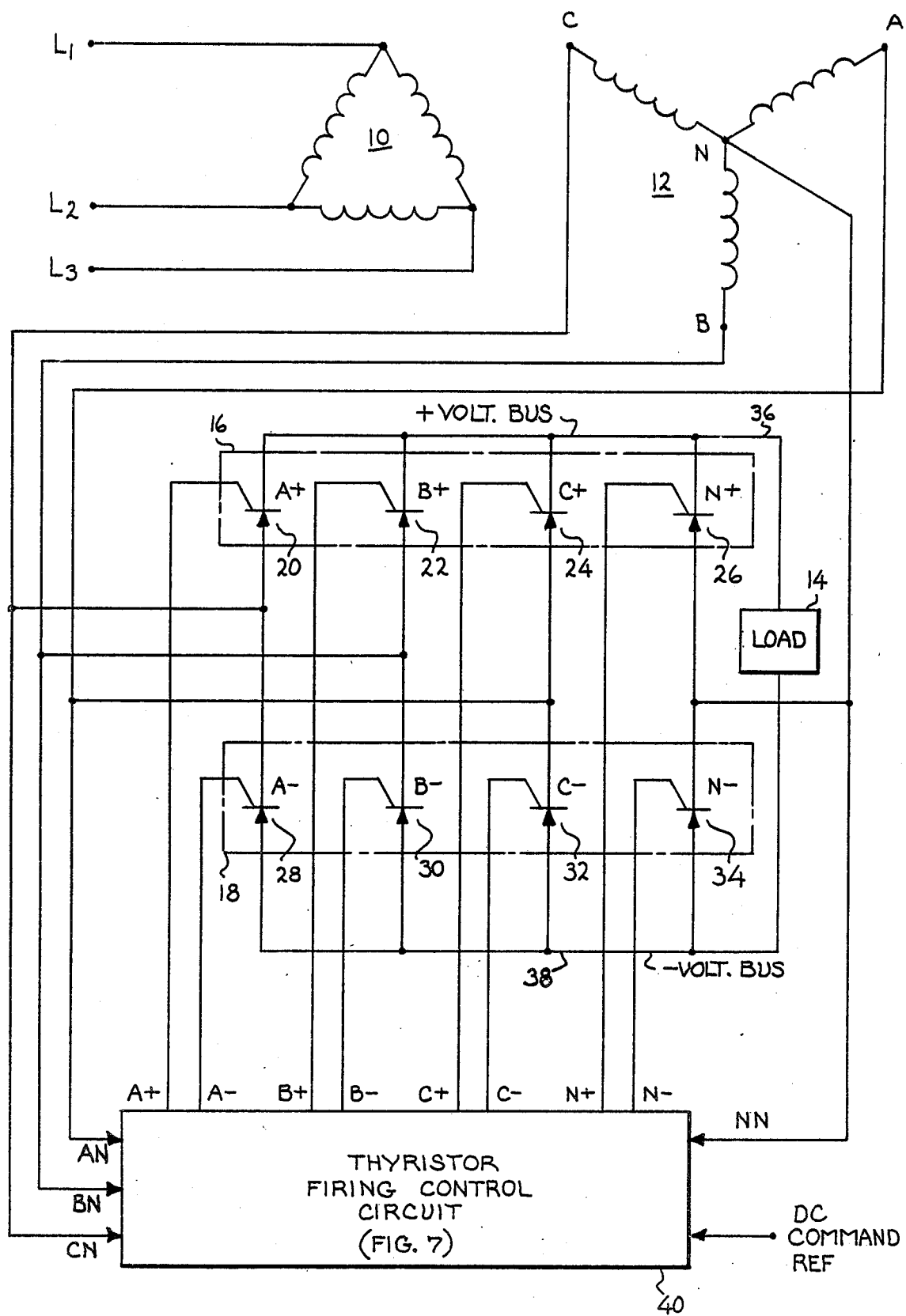
FIG. 1 is an electrical schematic diagram illustrative of a three phase bridge power conversion system having neutral thyristors including a firing control circuit according to the present invention.

Referring now to the drawings, FIG. 1, inter alia, discloses an a.c. to d.c. power converter of the type set forth and claimed in the above-referenced application, U.S. Ser. No. 748,281, incorporated herein by reference.

Before beginning a description of the present invention, however, it is believed advantageous to briefly discuss this type of converter in order to obtain a full comprehension and appreciation of the subject invention. Referring now to FIG. 1, a.c. power is supplied to the converter from a polyphase ($3\phi$) source represented by three terminals, $L_1$, $L_2$ and $L_3$ which are connected to a delta connected transformer primary 10. A transformer secondary winding indicated at 12 comprises a wye configuration with three windings, AN, BN, and CN, with a common point N being the neutral as is well known in three phase electrical power circuitry. A.C. power is converted to d.c. power and applied to a load 14 by means of series connected positive and negative groups 16 and 18, respectively, of four controlled rectifiers. The controlled rectifiers are shown consisting of silicon controlled rectifiers (SCR) which belong to that class of semiconductor devices known as thyristors, which term will be used for the sake of convenience but not limitation for the remainder of this description.

Four thyristors 20, 22, 24 and 26 form the A+ to N+ positive group 16, while thyristors 28, 30, 32 and 34 make up the A− to N− negative group 18. The cathodes of the positive group 16 are commonly connected to a positive voltage bus 36 which couples to one side of the load 14 while the anodes of the negative group 18 are commonly connected to a negative voltage bus 38 which couples to the opposite side of the load 14. The thyristors 20 . . . 34 of the two groups have their gate electrodes respectively connected to a firing control circuit 40 for selectively rendering the thyristors conductive, i.e. fired at the desired point within the line to neutral phase voltage to which they are connected in order to control the voltage applied to the load in response to a command voltage applied thereto. It is to the area of the firing control both in its method and apparatus to which the present invention is directed.

Figure 2:
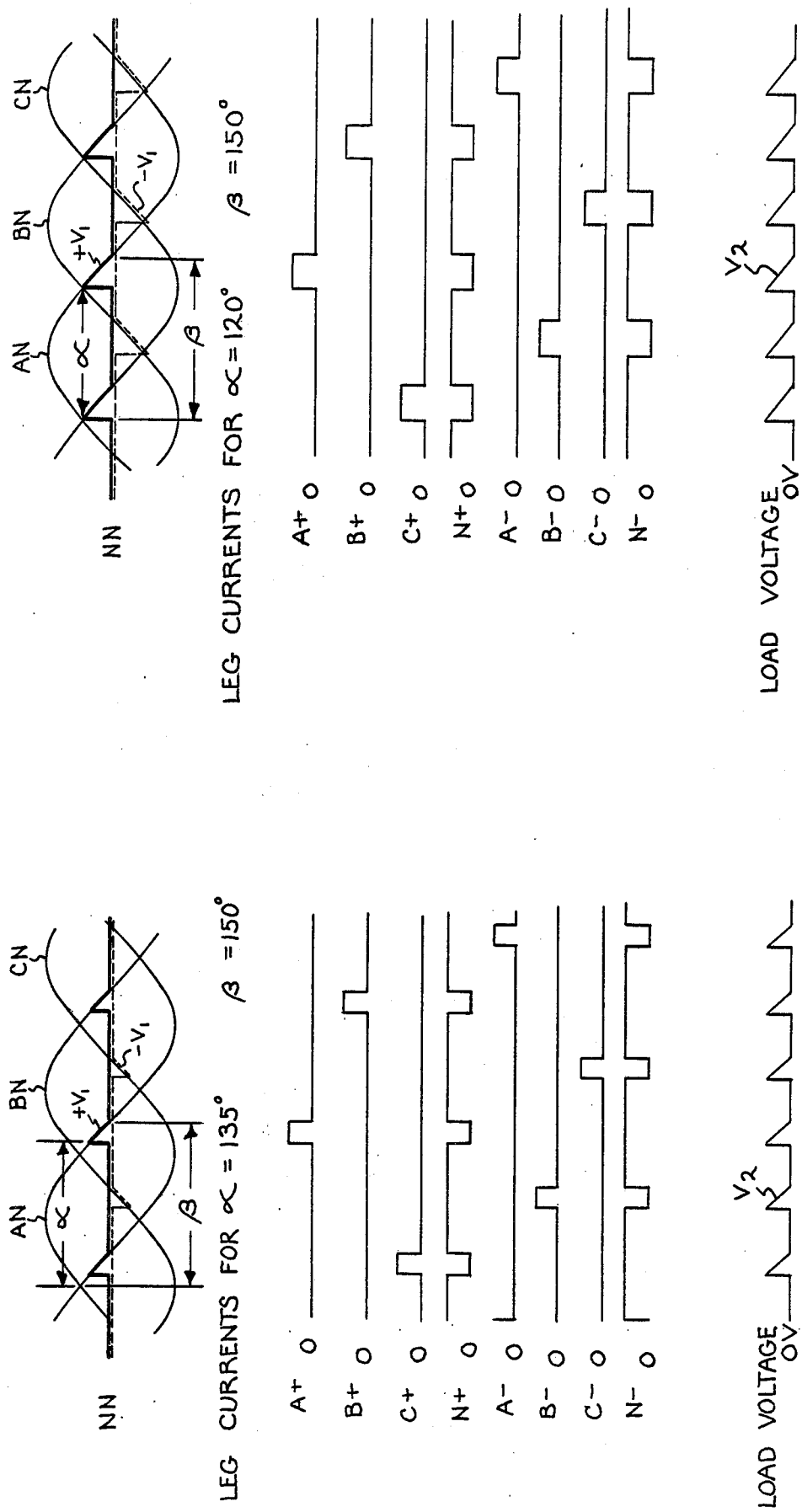
FIGS. 2A and 2B are a set of waveforms illustrative of prior art operation of a bridge converter having neutral thyristors operating in the first quadrant at low power output.

Suffice it to say that the addition of the neutral thyristors 26 and 34 as taught in the referenced LaFuze application U.S. Ser. No. 748,281, provides a significant advance in the art of converter control in that a system is now known which is adapted for first and fourth quadrant operation while at the same time improving the system power factor while reducing load voltage ripple when operating at reduced output voltage. Such operation in the first and fourth quadrant is illustrated in FIGS. 2A through 3. In the figures, two firing angles, alpha ($\alpha$) and beta ($\beta$) must be considered. Alpha or simply $\alpha$ denotes the firing angle for a particular phase leg thyristor while the firing angle beta or simply $\beta$ represents the firing angle for the neutral leg thyristor, it being understood that the same applies for the other like thyristors. Both firing angles are measured from the crossover of adjacent line to neutral phase voltages.

Referring now to FIG. 2A, there is shown typical prior art operation for the condition $\alpha=135°$, and $\beta=150°$. Beneath the line to neutral phase voltages AN, BN and CN, there is shown a set of time related voltage and current waveforms for the eight thyristors 20 . . . 34. The voltage $+V_1$ signifies the voltage on the + voltage bus 36 (FIG. 1) with respect to supply neutral NN for the positive group of thyristors, while $-V_1$ designates the voltage on the − voltage bus 38 of the negative group of thyristors. The respective currents are identified as A+, B+, C+, etc. It can be seen with respect to the current waveform N+ for the neutral thyristor 26 that when it is rendered conductive following any phase leg thyristor 20, 22 and 24 having been rendered conductive, the current is commutated to the conductive neutral thyristor 26 driving the voltage $+V_1$ to zero or NN and if the conduction period of the respective phase thyristors is less than 60°, the current waveforms N+ and N− indicate that both neutral thyristors 26 and 34 are simultaneously conductive between the interpulse periods of the phase thyristors indicated by the flat spots or zero voltage levels on the waveforms $+V_1$ and $-V_1$ as well as the composite load voltage $V_2$.

FIG. 2B is a set of waveforms similar to that shown in FIG. 2A with the exception that the firing angle $\alpha$ is changed to 120° providing a longer conductive period for each of the phase thyristors while maintaining the firing angle $\beta$ of the neutral thyristors the same. It is apparent from the voltage waveforms $+V_1$ and $-V_1$ that as the phase leg thyristor conduction increases for a fixed firing angle of the neutral thyristor, the voltage across the load $V_2$ and accordingly the power applied thereto increases for corresponding decrease in the simultaneous conduction periods of the neutral thyristors. This characteristic has significance as will become evident as the following discussion proceeds.

FIG. 3 indicates the normal mode of operation in the fourth quadrant wherein commutation of current from the neutral leg thyristor must be made to a phase leg thyristor which is positive and then let conduction proceed into the negative voltage region. Such a condition exists for example with $\alpha$ equal to 120° and $\beta$ equal to 210°. This then leads into consideration of FIG. 4. If a reverse voltage command is applied within the interval t₁ and t₂, there will be no response, inasmuch as both neutral thyristors are conductive as previously explained. The system must wait until the time t₂ at which a positive phase leg thyristor is fired. Voltage reversal occurs at time t₃ and the system then makes a transition into a normal fourth quadrant operation.

Figure 4:
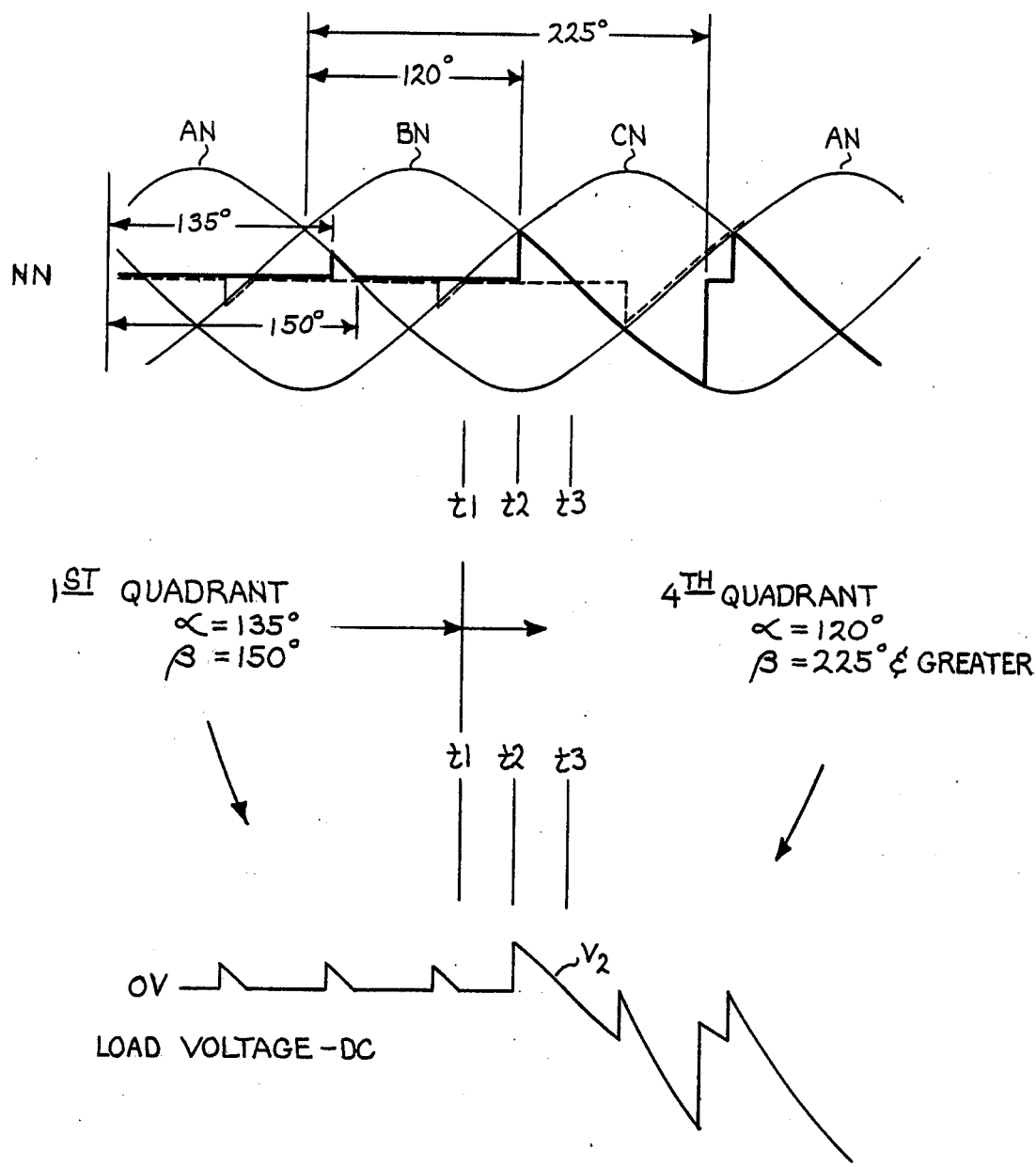
FIG. 4 is a set of waveforms illustrative of the response characteristic for a transition from first to fourth quadrant according to prior art methods of operation.

Inasmuch as system response can be improved during voltage reversal if the delay time existing between t₁ and t₂ in FIG. 4 is eliminated, a solution to this problem is demonstrated in FIGS. 5A and 5B and consists of controlling the phase and neutral thyristors in a three phase system, for example, such that the phase leg thyristors are conductive for at least 60 electrical degrees immediately followed by a conduction period of the respective neutral thyristor for the remainder of the phase to neutral line voltages.

Generalized, it may be stated that the phase leg thyristors are rendered conductive for at least $n/2$ degrees within the respective successive cycles of the polyphase source voltage, where n is the electrical separation between the line to neutral phase voltages, while the neutral leg thyristors are rendered conductive for the remainder of the separation interval between line to neutral phase voltages. Thus, for example, in a three phase system reference to FIG. 5A indicates that $n=120°$ and where the firing angle $\alpha$ of the phase leg thyristors is 120°, a 60° conduction interval can be obtained by establishing a firing angle $\beta$ of the neutral thyristors equal to 180°, which results in a conduction interval of 60° for the neutral thyristors also. As evidenced by the d.c. load voltage $V_2$, no flat spots in the voltage characteristic exist since neutral leg thyristors are not simultaneously conductive, as evidenced by the current waveforms N+ and N−. In other words, the neutral leg thyristors are mutually conductive and nonconductive, and vice versa within each polyphase cycle. While the voltage waveform $V_2$ in FIG. 5A indicates an average load voltage equal to zero, inasmuch as equal periods of positive and negative voltage operation exist, the firing angles $\alpha$ and $\beta$ can be shifted as long as the difference therebetween is equal to or greater than 60°. For a positive d.c. low voltage, FIG. 5B suggests that the firing angle $\alpha$ may be variable between 90° and 120°, while the angle $\beta$ simultaneously varies between 150° and 180° while maintaining a 60° difference between firing angles. This mode of operation is depicted as being mode III in FIG. 14, which wil be discussed subsequently. Reference now to FIG. 6 indicates that where a 60° minimum conduction interval for each phase thyristor is maintained, response to voltage reversal command is enhanced, meaning that the heretofore transport lag or time delay between the periods t₁ and t₂ of FIG. 4 is eliminated. If the reverse command voltage is applied substantially concurrently with one negative phase leg thyristor being rendered conductive, the time between t₁ and t₂ has been eliminated as shown in FIG. 6. A reverse command prior to time t₁ or later than t₃ in FIG. 6 will result in even less time for voltage reversal. Thus, firing control of the eight thyristors shown in FIG. 1 according to the method outlined with reference to FIGS. 5 and 6 will improve the dynamic response of the converter system when operating in the low voltage region, particularly as it relates to response during voltage reversal and transition from first quadrant to fourth quadrant operation is effected.

Referring now to FIGS. 7 through 12, there is disclosed means for not only implementing the method set forth above, but also adapted to generate thyristor firing pulses in accordance with a digital logic sequence, to be subsequently explained, over a wide range of operation which includes, for example, five different operating modes including the aforementioned method depending upon the value of the applied d.c. command voltage. This range of operation is depicted in the diagram shown in FIG. 14 and will be referred to from time to time as this detailed description proceeds.

Figure 7:
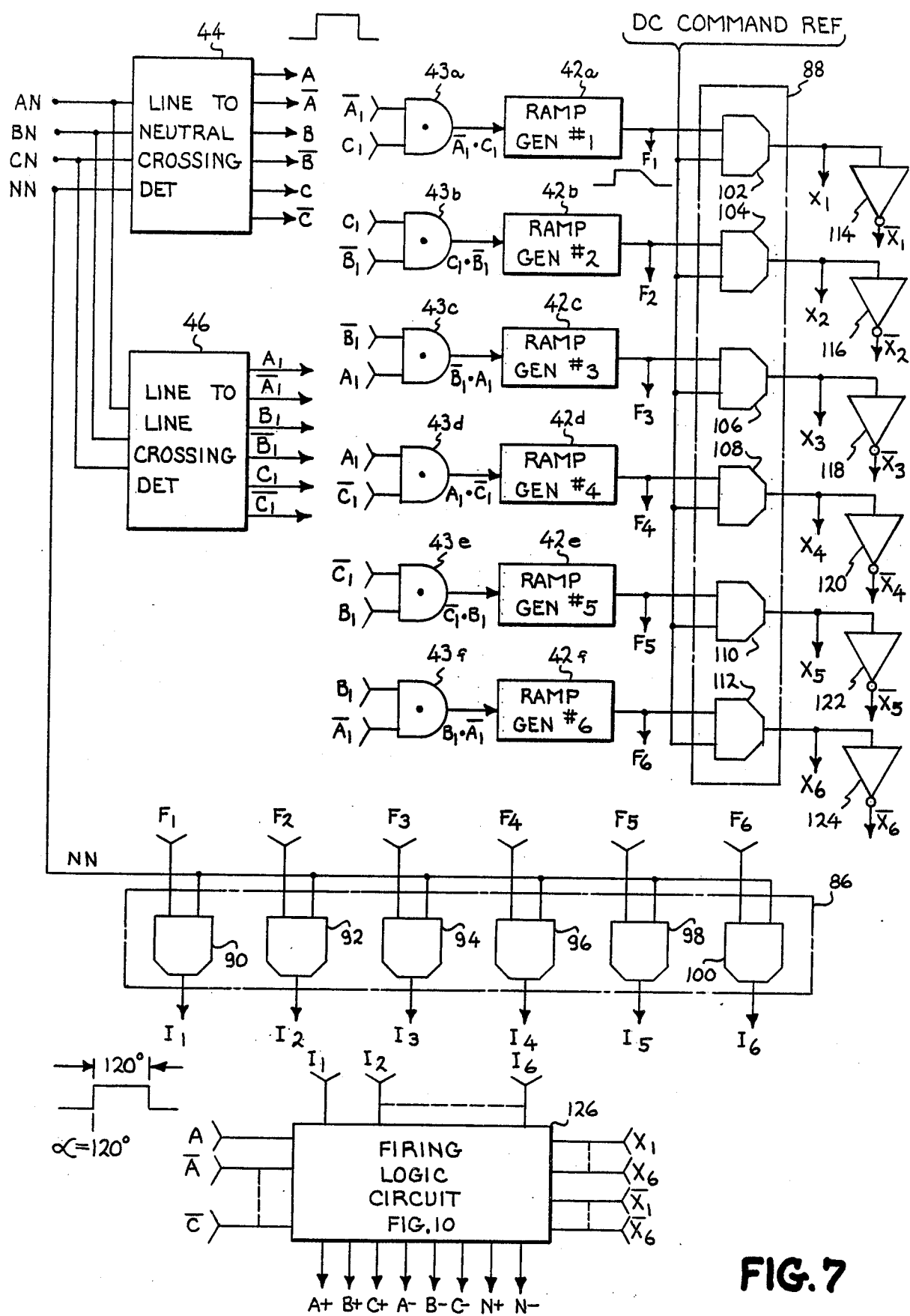
FIG. 7 is an electrical schematic diagram illustrating the details of the firing control circuit shown in FIG. 6.
Figure 8:
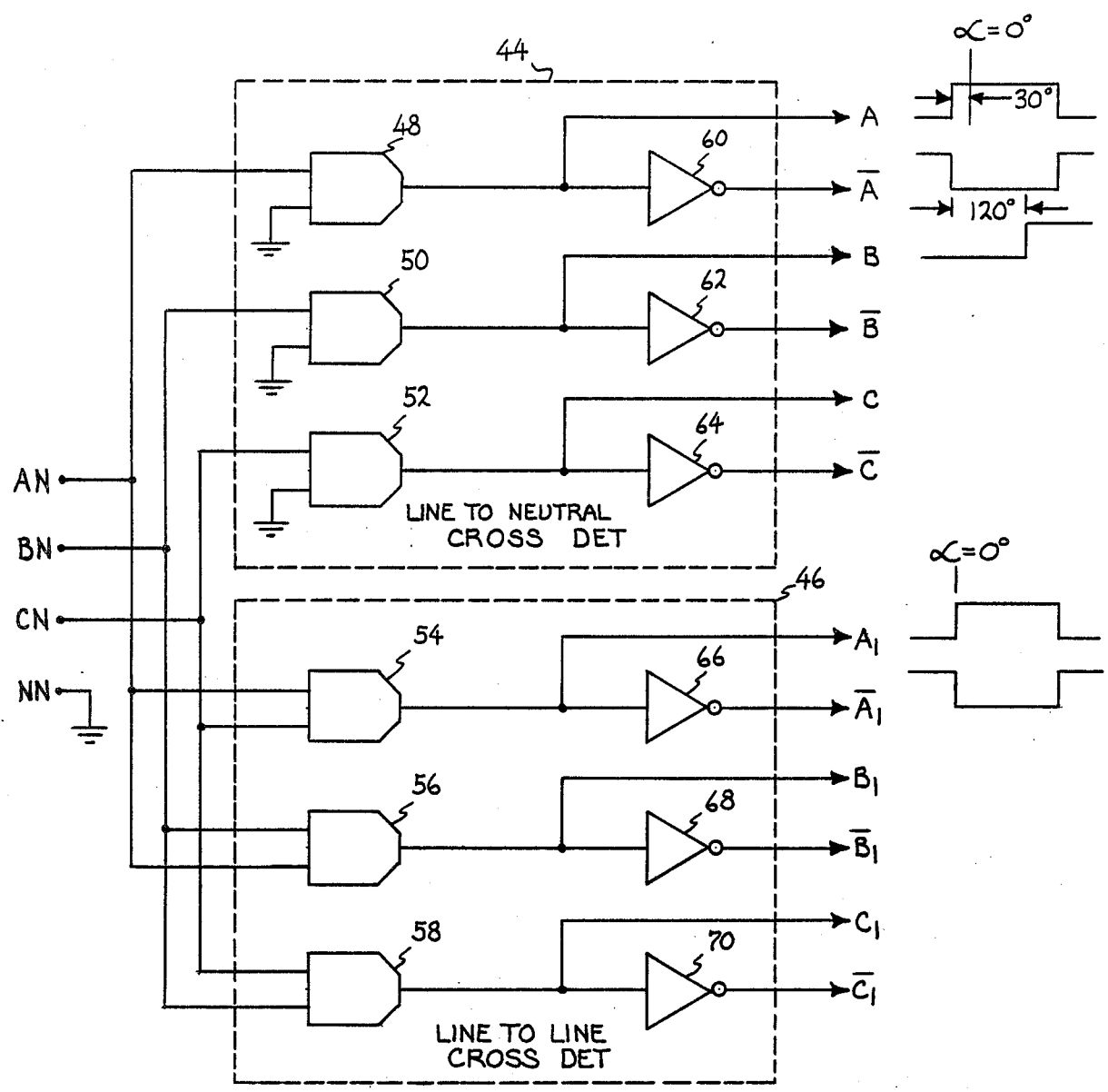
FIG. 8 is an electrical schematic diagram illustrative of the phase voltage crossing detectors shown in FIG. 7.

As to FIG. 7, there is disclosed the preferred embodiment of the thyristor firing control circuit for the bridge converter as shown in FIG. 1, which is operable to generate, in a desired sequence, eight thyristor firing pulses A+, B+, . . . N− for the thyristors 20 through 34 forming the positive and negative four pulse groups of thyristors 16 and 18, whereupon the d.c. output voltage is controlled in accordance with the variation of the thyristor firing angles effected in accordance with the application of the firing pulses.

Whereas prior art three phase firing pulse generators typically determine the firing angle for the thyristors by the intersection of a single firing reference waveform, e.g. a cosine wave or a linear ramp of 180° with a d.c. command voltage, the present invention utilizes a plurality of firing reference waveforms equal in number to the number of phase leg thyristors. The waveforms are mutually time related, having an electrical separation of one half the electrical separation between line to neutral phase voltages; i.e., 60° which are then utilized to develop logic signals variable in time. The logic signals are logically combined with logic signals fixed in time relative to time relation of the phase voltages of the a.c. power source to automatically effect proper mode operation as well as providing a smooth continuous transition between modes.

The embodiment as disclosed in FIG. 7 utilizes six ramp signal generators 42a, 42b, 42c, . . . 42f coupled to respective AND gates 43a . . . 43f. In addition to the ramp generators, a line to neutral crossing detector circuit 44 is provided as is a line to line crossing detector 46. The line to neutral crossing detector circuit 44 is adapted to provide a first set of square wave logic signals A, B, C and their complements $\overline{A}$, $\overline{B}$ and $\overline{C}$. These signals are fixed in time relative to one another in accordance with the cyclic variation of the source phase voltages AN, BN, CN coupled thereto. The leading and trailing edges or flanks of these waveforms occur where respective sinusoidal source phase voltage waveforms intersect system neutral NN (zero voltage level). The line to line crossing detector circuit 46 is coupled to the sinusoidal source phase voltages AN, BN and CN, and generates a second set of square wave logic signals $A_1$, $B_1$, $C_1$ and their complements $\overline{A}_1$, $\overline{B}_1$ and $\overline{C}_1$ which are selectively applied in pairs to the AND gates 43a . . . 43f. The flanks of these signals are determined by the respective crossing of the phase voltages and are accordingly displaced in phase from the first set of reference square waves A, B, etc. by 30 electrical degrees.

The zero firing angle reference for $\alpha$ and $\beta$ is established by the waveforms $A_1$, $B_1$, etc. while the waveforms A, B, etc. provide a convenient means for establishing mode changes and an inversion limit or end-stop control as will be shown subsequently. Both detector circuits 44 and 46 are shown in detail in FIG. 8, and are comprised of three comparators each (48, 50, 52 and 54, 56, 58). Each comparator is adapted to output a square wave in accordance with the inputs applied thereto. The comparators 48, 50 and 52 have one respective input coupled to the voltage reference NN, which is the neutral point of the source secondary winding 12 shown in FIG. 1. The other respective input to the comparators are coupled to source phase voltages AN, BN, and CN. Accordingly, comparator 48 is adapted to output the square wave A while comparators 50 and 52 output square waves B and C. Three inverter circuits 60, 62 and 64 are coupled to the comparators 48, 50 and 52 and respectively output the square waves $\bar{A}$, $\bar{B}$, and $\bar{C}$.

The detector circuit 46 differs in the manner in which the inputs are applied to comparators 54, 56 and 58. As shown, comparator 54 has its two inputs coupled to source voltages AN and CN and accordingly generates the square wave $A_1$. In a like manner, comparators 56 and 58 operate to generate square waves $B_1$ and $C_1$. By means of respective inverters 66, 68 and 70, the square wave complements $\bar{A}_1$, $\bar{B}_1$ and $\bar{C}_1$ are also provided. Since the phase voltages AN, BN and CN are separated in phase by 120°, the waveforms $A_1$, $B_1$ and $C_1$ are also separated by 120°; however, by utilizing the complements $\bar{A}_1$, $\bar{B}_1$ and $\bar{C}_1$, six square waves successively separated by 60° are provided and are individually fed to the ramp generators $42a \ldots 42f$ in the sequence $A_1$, $\bar{C}_1$, $B_1$, $\bar{A}_1$, $C_1$ and $\bar{B}_1$.

Figure 9:
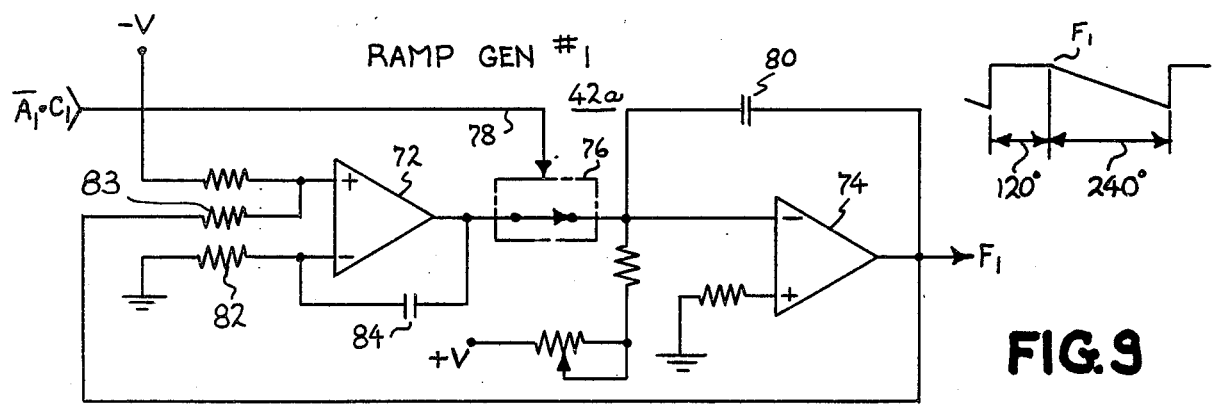
FIG. 9 is an electrical schematic diagram illustrative of one typical ramp and signal generator shown in FIG. 7.

The ramp generators are identical in configuration and a typical example is shown in FIG. 9. The ramp signal generator shown in FIG. 9 comprises the generator 42a shown in FIG. 7 and comprises a pair of operational amplifiers 72 and 74 connected together by means of an analog switch 76 which is adapted to be operated by means of a signal voltage applied to circuit lead 78, which in this embodiment comprises the 120° logic waveform $\bar{A}_1 \cdot C_1$ from AND gate 43a. The amplifiers 72 and 74 may, when desirable, be comprised of a commercially available dual 747 integrated circuit. In addition to its associated circuitry for applying d.c. bias potentials $-V$ and $+V$, the amplifier 74 includes a Miller integrator capacitor 80 as well as a feedback resistor 83 to the + input of operational amplifier 72, which also includes a feedback capacitor 84. The circuit is operable such that when the signal $A_1 \cdot C_1$ is applied the analog switch 76 controls the output $F_1$ of operational amplifier 74 rendering it high for a period of 120° and then opens allowing the integrator capacitor 80 to produce the 240° negative slope ramp.

Figure 13:
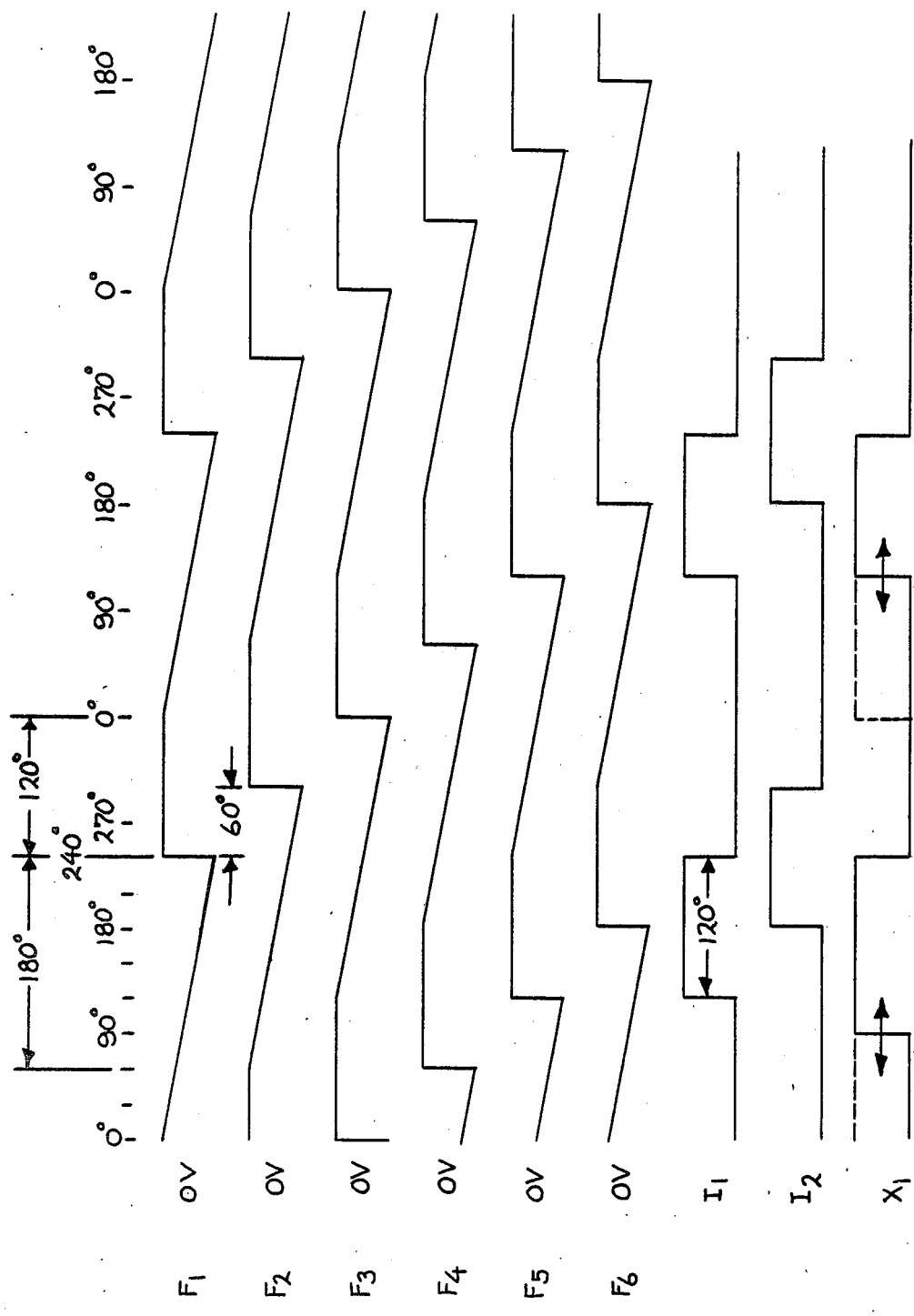
FIG. 13 is a set of waveforms illustrative of the ramp signals generated by the circuitry shown in FIG. 7 and providing a set of firing reference waveforms for controlling the subject converter.

The other five ramp generators $42b \ldots 42f$ are identical to the configuration shown in FIG. 9 and respectively output firing reference ramp waveforms $F_2$, $F_3$, $F_4$, $F_5$, $F_6$ with successive firing waves being separated from its immediate predecessor by 60°. This relationship is shown in FIG. 13, where, for example, the firing waveform $F_1$ ramps downward from 0° to 240° whereupon it repeats itself by going high and remaining high for another 120° before ramping downward once again for 240°. FIG. 13 indicates that the firing wave $F_2$, generated in response to the square wave reference waveform $C_1 \cdot B_1$ applied to ramp generator 42b in FIG. 7, is delayed in phase by 60°. It is also interesting to note that the two firing waveforms $F_1$, $F_2$ have overlapping ramp portions which extend for 180°. This relationship also holds true for each successive pair of firing waveforms $F_3$, $F_4$, etc. as well as $F_1$ relative to $F_6$. By generating the negative slope ramps for 240°, an overlap of 180° will occur, which overlap is required in the subject invention for full range control, inasmuch as any phase thyristor must be adapted to be fired in response to two successive firing waveforms, as will be shown in order to implement polymode operation.

Referring back now to FIG. 7, the six firing waveforms $F_1$ through $F_6$ are applied to two crossing detector circuits 86 and 88, which have applied thereto the system neutral voltage NN and the variable d.c. command reference signal, respectively. The crossover detector 86 is comprised of six comparators 90, 92, ... 100 which respectively provide a third set of fixed square wave logic waveforms $I_1$, $I_2$, $I_3 \ldots I_6$ in response to the firing waveforms $F_1$ through $F_6$ crossing the system neutral or zero volt level. As can be seen by reference to FIG. 13 and the firing waveform $F_1$, it crosses the zero volt level at 120°. Accordingly, any of the square wave waveforms $I_1$ through $I_6$ provide a logic signal which goes high at a firing angle of 120°.

The crossing detector circuit 88 is comprised of six comparator circuits 102, 104, 106, 108, 110 and 112. It is operable to compare the applied d.c. command reference against the voltage ramps of the firing reference waveforms $F_1$ through $F_6$ and respectively generate six square wave logic signals $X_1$, $X_2 \ldots X_6$, whose leading edges vary in accordance with the crossover point of the respective ramp voltages to the command reference as shown in FIG. 13 with reference to the illustrated signal $X_1$. Respective logic inverters 114, 116, 118 ... 124 are coupled to the comparator outputs which respectively provide the complement logic signals $\bar{X}_1$, $\bar{X}_2 \ldots \bar{X}_6$.

The thyristor firing signals A+, B+ ... N+ and N− are generated in a firing logic circuit 126 in response to the two sets of logic signals A, $\bar{A}$, B ... $\bar{C}$ and $I_1$, $I_2$ ... $I_6$ which are fixed in mutual time relationship as well as the set of square wave logic signals $X_1$, $X_2 \ldots X_6$ and their respective complements $\bar{X}_1 \ldots \bar{X}_6$ whose leading edges are variable.

Figure 10:
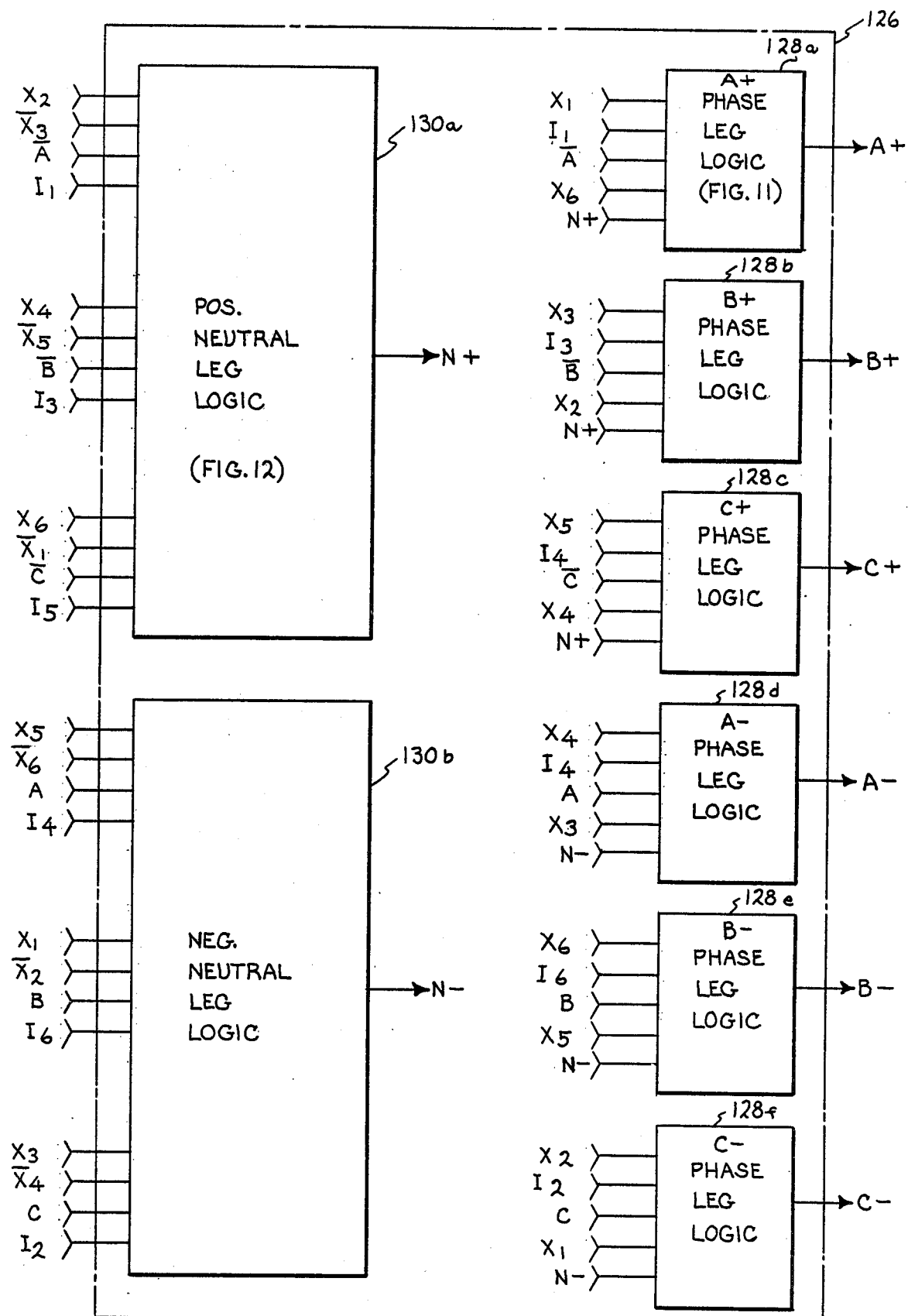
FIG. 10 is an electrical schematic diagram further illustrative of the firing logic circuit shown in FIG. 7.
Figure 11:
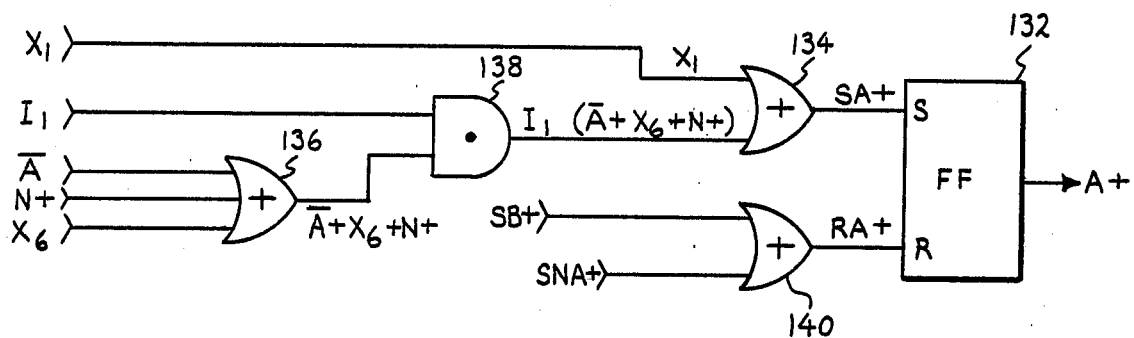
FIG. 11 is an electrical schematic diagram illustrative of one of the six phase leg logic circuits shown in FIG. 10.
Figure 12:
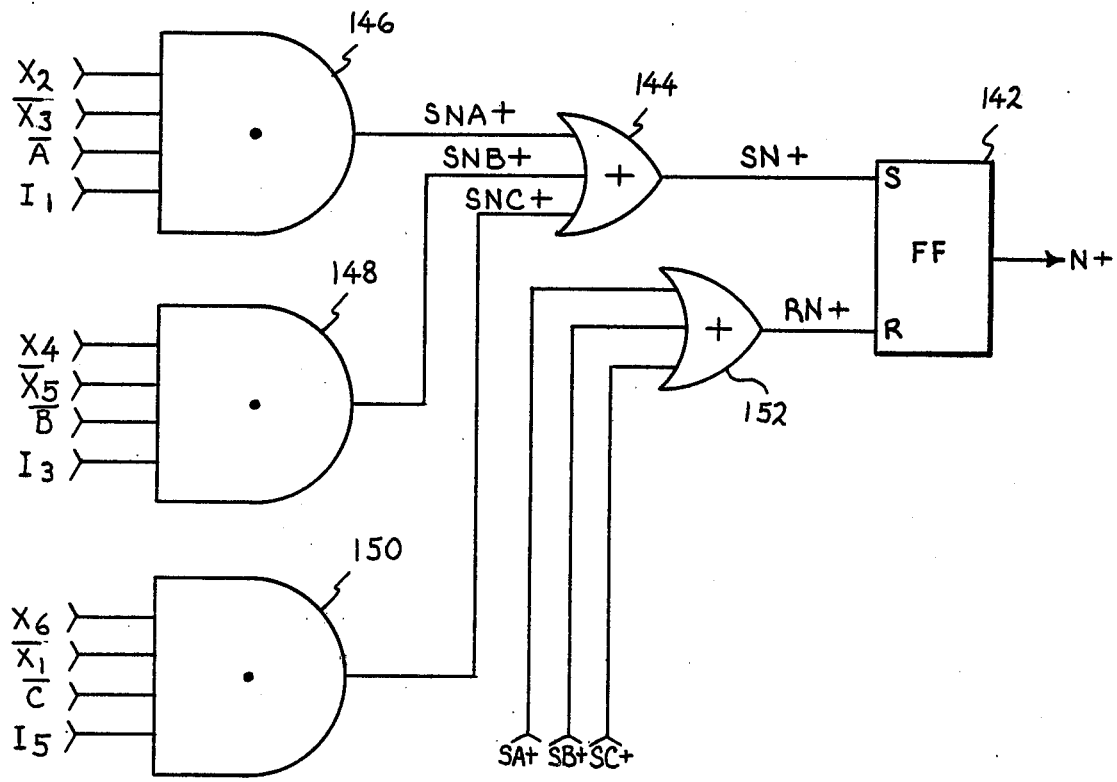
FIG. 12 is an electrical schematic diagram of one of the neutral leg logic circuits shown in FIG. 10.

The firing control logic circuit 126 is shown in greater detail in FIGS. 10, 11 and 12 and implement digital logic ($\cdot$ = AND and + = OR) expressions generally in the form of $X_n + Y_n(Z_n + X_{n-1} + N^*)$ and $X_{n+1} \cdot Z_n \cdot \bar{X}_{n+2} \cdot Y_n$ which are adapted to logically gate; i.e., render conductive, the phase and neutral leg thyristors, respectively, where X is one of the logic signals $X_1 \ldots X_6$, Y comprises one of the signals $I_1 \ldots I_6$ and Z is one of the signals A, B ... $\bar{C}$ where $Z_1 = \bar{A}$, $Z_2 = C$, $Z_3 = \bar{B}$, $Z_4 = A$, $Z_5 = \bar{C}$ and $Z_6 = B$. Where $n = 1$, the term $X_{n-1}$ is meant to be interpreted as $X_6$. The term $N^*$ is meant to be interpreted as N+ for the positive phase leg thyristors and N− for the negative leg thyristors.

It will now be shown the manner by which these logic expressions control the firing angles of both the phase leg thyristors 20, 22, 24 and 28, 30 and 32, as well as the neutral leg thyristors 26 and 34. Reference to FIG. 10 indicates that six phase leg logic circuits 128a, 128b, 128c ... 128f and two neutral leg logic circuits 130a and 130b having predetermined combinations of the aforementioned logic signals respectively generate the eight firing signals A+ ... N− for the positive and negative group thyristors 16 and 18 shown in FIG. 1.

A typical phase leg thyristor logic circuit 128 is shown in FIG. 11 and includes a set reset type flip-flop 132 which has its set or S terminal coupled to a set signal SA+ which results from the combination of logic signals $X_1$, $I_1$, $\bar{A}$, $X_6$ and N+ (FIG. 12) being combined in a pair of OR gates 134 and 136 and an AND gate 138 to provide the expression:

$$SA+ = X_1 + I_1 \cdot (\bar{A} + X_6 + N+)$$

The flip-flop 132 is adapted to be reset by the signal RA+ which is provided by a third OR gate having two inputs SB+ and SNA+ applied thereto and which are defined as:

$$SB+ = X_3 + I_3 \cdot (\overline{B} + X_2 + N+)$$

$$SNA+ = X_2 \cdot \overline{A} \cdot \overline{X}_3 \cdot I_1$$

The flip-flop 132 is thus adapted to provide the firing pulse A+ for the thyristor 20 when it is set with the flip-flop being reset by the firing of the neutral leg N+ thyristor 26 of the positive group or the firing or the next phase leg B+ thyristor 22, whichever comes first in time.

Referring now to FIG. 12, there is disclosed one of the neutral leg logic circuits 130a for the positive pulse group thyristor 26. It is comprised of a set reset type flip-flop 142 having its set terminal S coupled to a set signal SN+ which is generated by a three input OR gate 144 coupled to the output of three four-input AND gates 146, 148 and 150. The SN+ signal is generated whenever any of three set neutral signals for the A+, B+, C+ thyristors 20, 22 and 24 are generated in accordance with the generalized logic mentioned above, a typical example being SNA+ signal being the ANDed combination of $X_2 \cdot \overline{A} \cdot \overline{X}_3$ and $I_1$. The flip-flop 142 is adapted to be reset by a signal RN+ applied to the reset terminal R and developed from an OR gate 152 which has inputs applied thereto corresponding to either of the positive group thyristors being gated ON by the signals SA+, SB+, SC+.

Reference now to TABLE I shows all of the various combinations of logic signals which are applied to the phase and neutral leg logic circuits 128 and 130 shown in FIGS. 10, 11 and 12.

TABLE I $$SA+ = X_1 + I_1 \cdot (\overline{A} + X_6 + N+)$$
$$SB+ = X_3 + I_3 \cdot (\overline{B} + X_2 + N+)$$
$$SC+ = X_5 + I_5 \cdot (\overline{C} + X_4 + N+)$$
$$SA- = X_4 + I_4 \cdot (A + X_3 + N-)$$
$$SB- = X_6 + I_6 \cdot (B + X_5 + N-)$$
$$SC- = X_2 + I_2 \cdot (C + X_1 + N-)$$
$$N+ = SN+ = (SNA+) + (SNB+) + (SNC+)$$
$$N- = SN- = (SNA-) + (SNB-) + (SNC-)$$
$$SNA+ = X_2 \cdot \overline{A} \cdot \overline{X}_3 \cdot I_1$$
$$SNB+ = X_4 \cdot \overline{B} \cdot \overline{X}_5 \cdot I_3$$
$$SNC+ = X_6 \cdot \overline{C} \cdot \overline{X}_1 \cdot I_5$$
$$SNA- = X_5 \cdot A \cdot \overline{X}_6 \cdot I_4$$
$$SNB- = X_1 \cdot B \cdot \overline{X}_2 \cdot I_6$$
$$SNC- = X_3 \cdot C \cdot \overline{X}_4 \cdot I_2$$
$$RA+ = (SNA+) + (SB+)$$
$$RB+ = (SNB+) + (SC+)$$
$$RC+ = (SNC+) + (SA+)$$
$$RA- = (SNA-) + (SB-)$$
$$RB- = (SNB-) + (SC-)$$
$$RC- = (SNC-) + (SA-)$$
$$RN+ = (SA+) + (SB+) + (SC+)$$
$$RN- = (SA-) + (SB-) + (SC-)$$

Five separate and distinct modes of operation are provided by the circuitry and combination of logic signals applied in accordance with the foregoing description. The five modes are defined with respect to the manner in which the phase and neutral leg thyristors are fired or not fired and accordingly provide an output voltage being of a positive polarity during rectifier operation while being of a negative polarity during inverting operations. Considering a normalized output voltage $V_{out(norm.)}$ as being the ratio of the actual d.c. output voltage to the maximum possible voltage, TABLE II indicates the various operational modes achieved from varying phase and neutral leg thyristor firing angles resulting from a full range of command voltages being applied.

TABLE II

| Mode | $V_{out(norm.)}$ | α | β |
|---|---|---|---|
| I | +1.0 to +0.866 | 0° to 30° | — |
| II | +0.866 to +0.5 | 30° to 90° | 150° |
| III | +0.5 to 0 | 90° to 120° | 150° to 180° (α +60°) |
| IV | 0 to −0.5 | 120° | 180° to 240° |
| V | −0.5 to −1.0 | 120° to 150° and Fire at 120° If Neutral Leg is ON | — |

Figure 14:
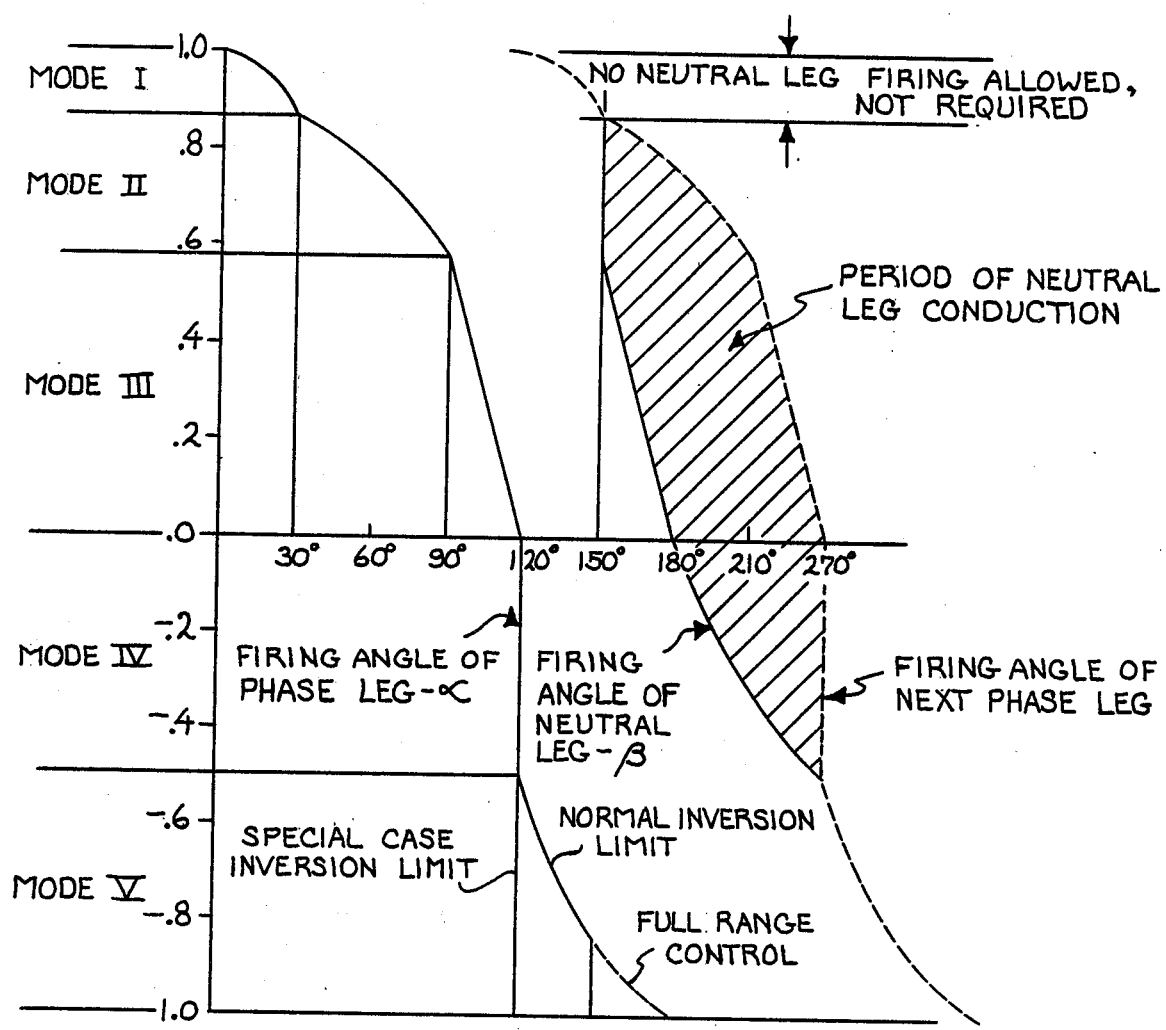
FIG. 14 is a graph illustrative of the five operating modes provided by the subject converter, one mode of which, mode III, is an example of the improved method shown by the waveforms in FIGS. 5A and 5B.
Figure 15:
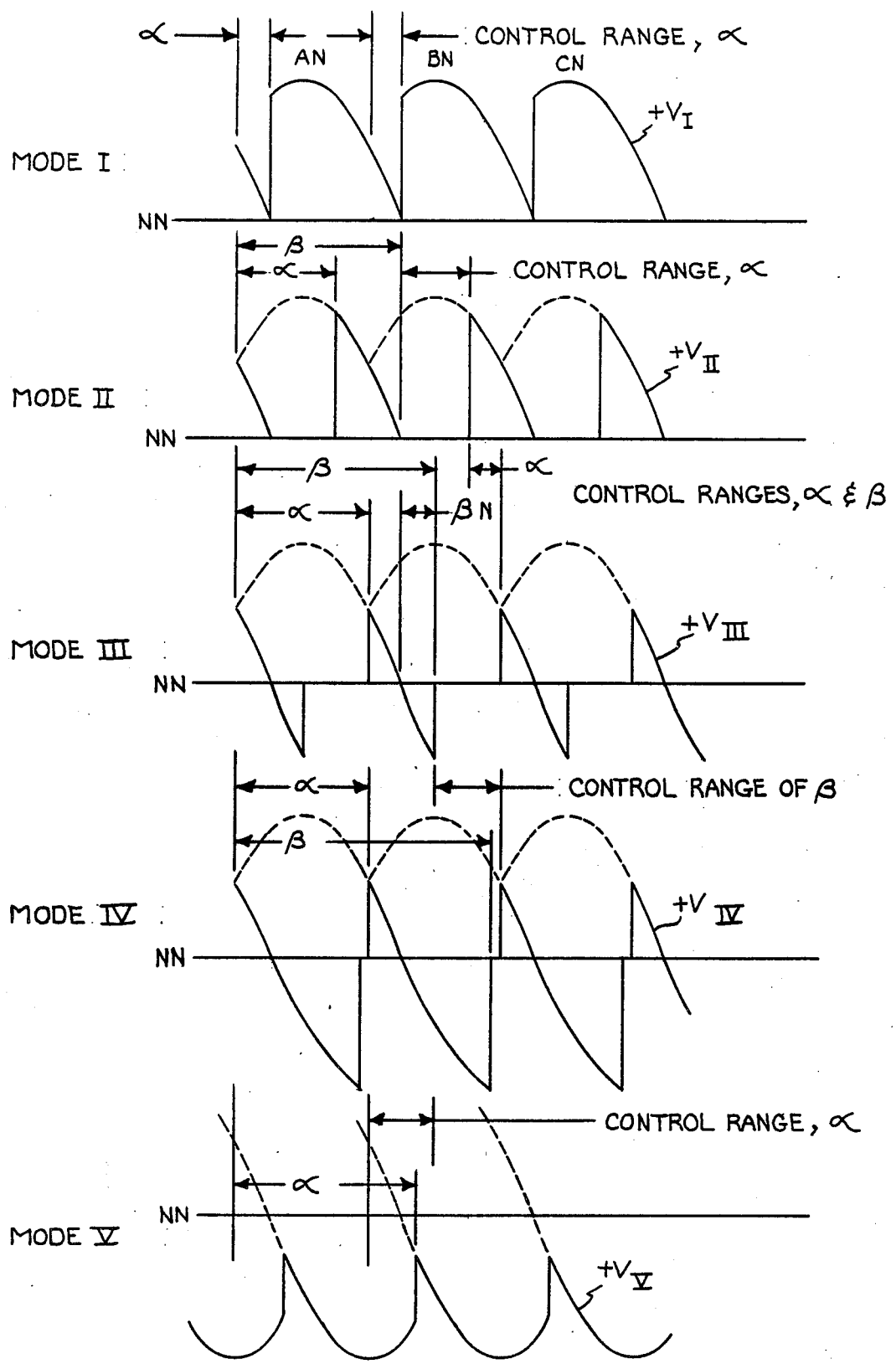
FIG. 15 is a set of waveforms illustrative of the voltage waveforms provided in the five operating modes shown in FIG. 14.

These five operational modes are also graphically represented in FIG. 14. The positive phase voltages for the various modes are also illustrated in FIG. 15. Considering now FIGS. 14 and 15, mode I comprises the operating range where β is variable between 0° and 30° while the neutral leg thyristors are not fired. Hence, there is no firing angle β and the normalized output voltage varies between 1.0 and 0.866. Mode I is further illustrative of prior art practice in a three pulse system wherein no neutral leg thyristor is utilized. The positive group phase leg output voltages are shown in FIG. 15 by the wave $V_I$.

Mode II occurs where the phase leg firing angle α is varied between 30° and 90° and the neutral leg firing angle β is held constant at 150°. Such operation provides phase voltages of the type shown in FIG. 15 as waveform $V_{II}$ and typifies moreover the system of operation of the above-referenced LaFuze application, U.S. application Ser. No. 748,281.

Mode III which is of primary consideration consists in varying β between the limits of 90° and 120° while firing the neutral leg thyristors 60° thereafter over the range of 150° to 180°. In this mode, the phase thyristors are rendered conductive for a period of 60° followed by 60° conductive periods of the neutral leg thyristors. This method of operation has been considered above and where it is worthy of note to indicate that mode III exists at relatively low output levels, e.g. in the range of +0.5 down to 0 output which condition is shown by the waveform $V_{III}$ of FIG. 15, wherein O average power is delivered to the load 14 shown in FIG. 1.

Progressing to operation of Mode IV, the phase leg firing angle α is maintained constant at 120° while the neutral leg thyristor firing angle θ is varied between the range of 180° to 240°. In this mode operation of the system makes a transition into fourth quadrant of operation wherein power is delivered back into the source from the load. Also this mode constitutes operation from 0 to −0.5 normalized output voltage. A typical positive thyristor group output voltage waveform is depicted by waveform $V_{IV}$.

Fourth quadrant operation from −0.5 to −1.0 normalized output voltage constitutes Mode V and consists in the neutral leg thyristors not being fired but simply varying the firing angle of the phase leg thyristors between the angle of 120° to 150°, the latter value being an inversion limit or end-stop 30° prior to the theoretical upper limit of 180°. Such operation is depicted by the waveform $V_V$ shown in FIG. 15. Since the leading edge of the logic signals $X_1 \ldots X_6$ and $\overline{X}_1 \ldots \overline{X}_6$ are determined by the transition of the negative going ramp portions of the firing waveforms $F_1$ through $F_6$ relative to the d.c. command voltage, the time relationship of these variable logic signals relative to the fixed logic signals sets the output voltage of the power converter and determines its operating mode (Modes I-V).

Figure 16:
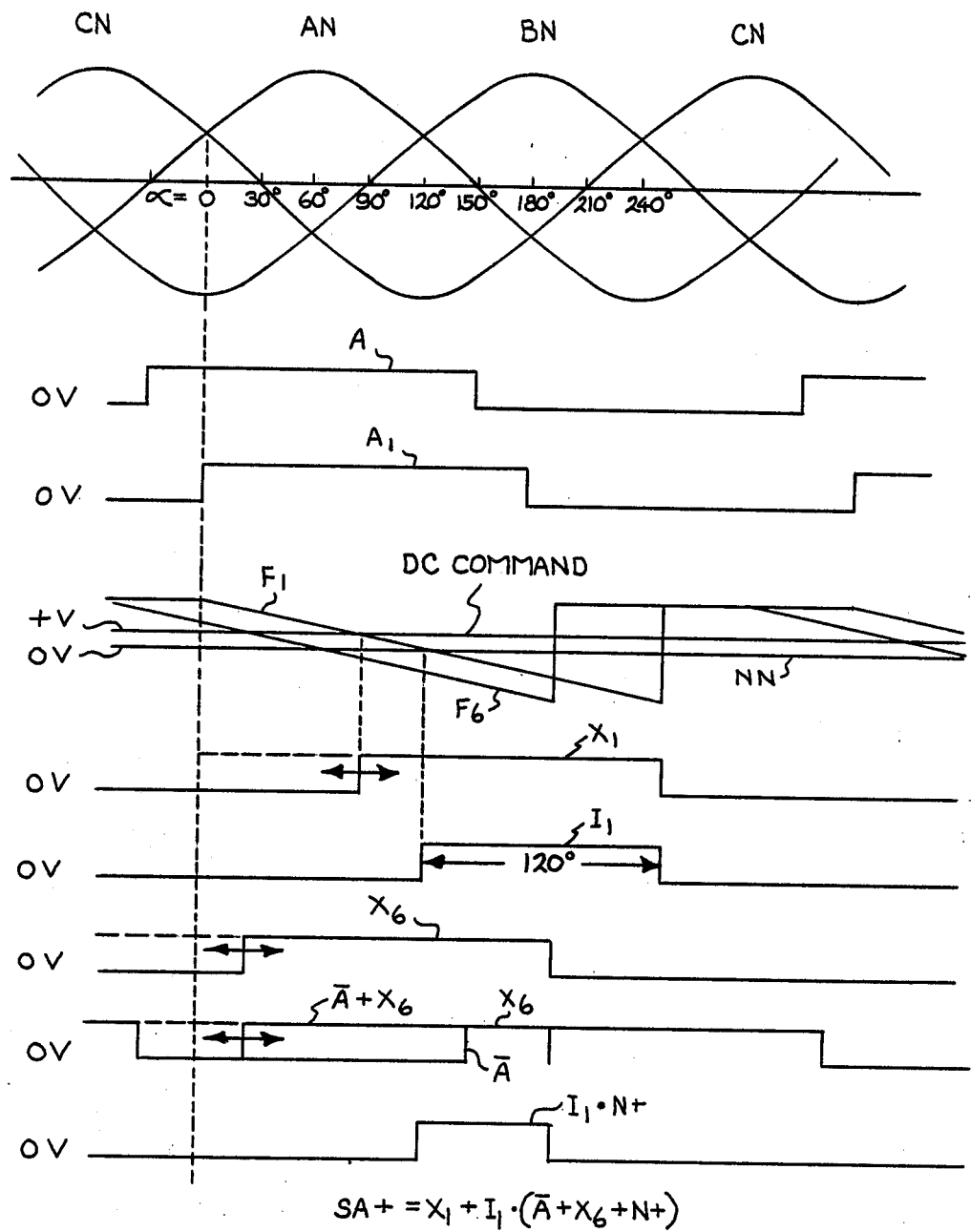
FIG. 16 is a set of waveforms illustrative of the manner in which a firing signal for a phase leg thyristor is logically generated according to the subject invention.
Figure 17:
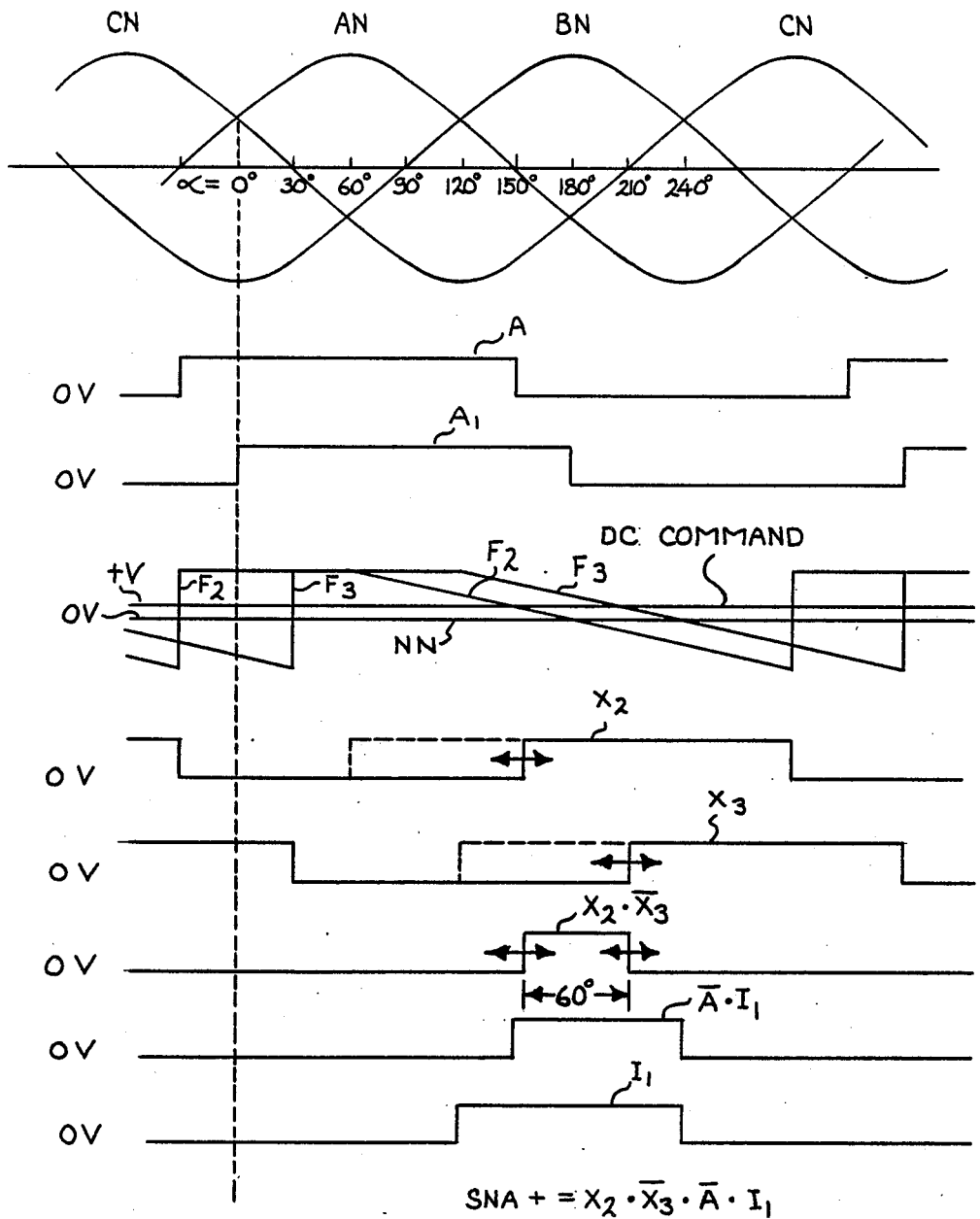
FIG. 17 is a set of waveforms illustrative of the manner in which the firing signal for a neutral leg thyristor is logically generated according to the subject invention.

Reference to FIGS. 16 and 17 will now be made to illustrate the implementation of the logic whereby the smooth transition from one mode to another is automatically made in response to the amplitude of the d.c. command voltage relative to system neutral (0 volts). FIG. 16, for example, discloses the combination of logic signals for generating the firing pulse for the A+ phase leg thyristor 20 of FIG. 1. Table I notes that the firing logic for this thyristor is expressed as $SA+ = X_1 + I_1 \cdot (\overline{A} + X_6 + N+)$ meaning that the firing is controlled by the signal $X_1$ or $I_1 \cdot \overline{A}$ or $I_1 \cdot X_6$ or $I_1 \cdot N+$. The time relationships of the waveforms shown in FIG. 16 indicate that if the d.c. command voltage is greater than zero, then the waveform $X_1$ will rise from a low logic value to a high logic value before the waveform $I_1$ whose leading edge is fixed at 120°. In this condition, the firing signal for the A+ thyristor 20 is controlled by the leading edge of the square wave $X_1$. This then encompasses Modes I, II and III, since it covers a range of 0° to 120° which is also borne out in the graph shown in FIG. 14. If the d.c. command voltage is depressed slightly below zero, the leading edge of signal $X_1$ will occur later in time than the leading edge of the fixed square wave $I_1$, whose leading edge is located at 120°. The firing of the thyristor will thus be now determined by the waveform $I_1$. Further depression of the d.c. command voltage will leave the firing under the control of waveform $I_1$ until the leading edge of the composite signals $\overline{A} + X_6$ falls behind 120° at which time thyristor control will now be determined by the waveform $X_6$. Accordingly, the range of voltage command in which the firing angle α is fixed by $I_{10}$ is from 0 to −0.5 which defines Mode IV on Table I and which is shown also at FIG. 14. When the d.c. command voltage is more negative than −0.5 of maximum, the firing of the A+ phase thyristor 20 is controlled by $X_6$. The firing angle accordingly can be varied from 120° to 150° where it becomes fixed by the high going leading edge of the waveform $\overline{A}$ and thus defines Mode V.

The signal $\overline{A}$ is chosen because it is particularly adapted to provide an inversion limit on the firing angle α. Ideally, the firing angle α in Mode V could extend to α=180°; however, in order to obtain commutation of current from one thyristor to another, the maximum angle α, commonly referred to as an end stop, must be limited to a value less than 180°. Since the line to neutral crossing detector circuit 44 which generates, inter alia, fixed reference waveforms A and $\overline{A}$ which respectively have a transition at 150° and since positive logic is employed throughout, the reference waveform $\overline{A}$ is conveniently available and accordingly is selected to generate an inversion limit at α=150°. This condition is also depicted as "normal" in FIG. 14.

In addition to the "normal" inversion limit shown in FIG. 14, there is also included in the present invention means for implementing a "special case" inversion limit for insuring current transfer to a phase leg thyristor at α=120° in the event that a neutral leg thyristor is conducting when, for example, a rapid change in operating mode is called for such as a step function command from one operating mode to Mode V. This is provided by the logic signal $I_n \cdot N^*$, a typical example being the signal $I_1 \cdot N+$ shown in FIG. 16. If this signal should occur before the time variable leading edge of $\overline{A} + X_6$, it will cause the A+ phase leg thyristor 20 to be gated. In normal operation this does not occur. If, however, under the circumstances where a neutral leg thyristor is in conduction when the signal $I_1$ goes high; i.e., at α=120°, then the phase leg thyristor will be fired. The firing of the phase leg thyristor at α=120° when a neutral leg thyristor is conducting assures current transfer from the neutral leg thyristor to the phase leg thyristor while the phase voltage is still positive, a well known prerequisite for proper commutation. Since it is essential for the system of the subject invention to be able to move rapidly into the deep inversion mode (Mode V) the $I_n \cdot N^*$ provides the required control function.

It should be pointed out that over the complete operating range, the A+ phase leg thyristor 20 comes under the control first of the firing reference ramp signal $F_1$ followed by an adjacent or immediately preceding ramp $F_6$ and that overlapping is necessary in order to make the transition. This then requires that for full range control the negative slope ramps of $F_1$ through $F_6$ extend for 240 electrical degrees. Since the firing of the A+ phase leg thyristor 20 is controlled by the flip-flop 132 (FIG. 11), the gating is accordingly terminated when either the N+ neutral leg thyristor 26 is fired or the following B+ phase leg thyristor 22 is rendered conductive.

It is obvious in view of the foregoing description that the firing sequence in Modes II, III and IV is such that The N+ neutral leg thyristor 26 is gated after each conductive period of the respective positive A+, B+, C+ phase leg thyristors 20, 22 and 24. This gating can be expressed as $SN+ = (SNA+) + (SNB+) + (SNC+)$. In a like manner, the negative or N− neutral leg thyristor 34 is fired following respective conduction periods for the A−, B− and C− phase leg thyristors 28, 30 and 32 and can be logically set forth as $SN- = (SNA-) + (SNB-) + (SNC-)$. Typically in Table I the term SNA+ refers to the firing of the N+ thyristor 26 following conduction of the A+ phase thyristor 20. The logic expression for the firing period is stated as $SNA+ = X_2 \cdot \overline{A} \cdot \overline{X}_3 \cdot I_1$. Table I also sets forth similar expressions for the remaining neutral thyristor firing periods. The timing signal generated by the logical expression for SNA+ could be stated by inspection of FIG. 14 as: The neutral cell is gated 60° later than the normal firing time of the phase leg thyristor for a period not to exceed 60°, beginning no sooner than 150° and ending no later than 240°.

This logic is further illustrated and reference is now made to the time related waveforms shown in FIG. 17. Whereas the firing of the A+ phase leg thyristor 20 was initially timed by the negative going ramp portion of the firing reference waveform $F_1$, the gating of the N+ thyristor 26 for the SNA+ conduction period is timed by the subsequent waveform $F_2$ and accordingly the logic signal $X_2$ which is separated from $F_1$ and $X_1$ by 60°. Accordingly, the SNA+ triggering signal will be generated upon the occurrence of the last high going leading edge of the four signals $X_2$, $\overline{X}_3$, $\overline{A}$ and $I_1$. This gating will not exceed 60° because a window is formed by the ANDing of signals $X_2$ and $\overline{X}_3$. Moreover, the composite waveform $\overline{A} \cdot I_1$ has its positive going leading edge fixed at 150° while its trailing edge exists at 240°. This condition forms a mask to limit neutral thyristor firing between the bounds of β=150° to 240° as required by Table II and as illustrated in FIG. 14, satisfying the requirements of Modes II, III and IV while inhibiting neutral cell firing in Modes I and V.

Thus while there has been shown and described what is at present considered to be the preferred method and embodiment of the subject invention, modifications thereto will readily occur to those skilled in the art. For example, all of the fixed reference waveforms A, B, C, etc. $A_1$, $B_1$, $C_1$, etc. and $I_1$ through $I_6$ may, when desirable, be derived from a modulo six ring counter driven by a pulse oscillator at six times the frequency of the a.c. source with a phase lock loop being used to control the oscillator so as to keep the reference waves locked to the a.c. source. Also, when desirable, a complete digital implementation may be resorted to by replacing the ramp voltages and the analog command signal with digital ramps and digital words, respectively. The ramps, for example, would be configured from digital counters driven by a voltage controlled oscillator synchronized to the a.c. source at a high multiple of source frequency. The comparators would thus become digital comparators. It is not desired, therefore, that the invention be limited to the specific details shown and described, but it is intended to cover in the appended claims all such modifications that fall within the spirit and scope of the invention.

Accordingly, I claim as my invention:

1. In a power conversion system for transferring continuous electrical current between a polyphase a.c. source having a neutral point and a load, said system including a first controlled rectifier circuit connecting each source phase to the load and a second controlled rectifier circuit connecting the load to the neutral point of the source, a method of controlling the rectifier circuits at relatively low power levels to improve system response, comprising the steps:
   (a) rendering said first controlled rectifier circuit conductive for each phase for at least n/2 degrees within respective successive cycles of the polyphase source voltage, where n is the electrical separation between line to neutral phase voltages;
   (b) immediately following each n/2 degree phase conduction, rendering said second controlled rectifier circuit for the remainder of the n degree separation interval within the respective polyphase cycle, thereby eliminating any non-conductive intervals for the composite conductive and non-conductive operation of the first and second controlled rectifier circuit.

2. The method defined by claim 1 wherein said first and second controlled rectifier circuits define a converter circuit consisting of a positive and a negative set of controlled rectifiers coupled across the load, with at least one rectifier of each set connected to each source phase, and a positive neutral and a negative neutral controlled rectifier respectively coupled to either side of the load and to the neutral point of the source, and wherein said step (b) comprises rendering said positive neutral controlled rectifier conductive for the remainder of said n degree interval following each n/2 degree conductive period of each controlled rectifier of said positive set and rendering said negative neutral controlled rectifier conductive for the remainder of said n degree interval following each n/2 degree conductive period of each controlled rectifier of said negative set,
   whereby simultaneous conduction of the positive and negative neutral controlled rectifier is prevented.

3. The method as defined by claim 2 wherein said polyphase source comprises a three phase source and wherein n is equal to 120°.

4. The method as defined by claim 2 wherein n, the electrical separation between the phase to neutral voltages, is 120° and the conduction interval of each controlled rectifier of said positive and negative set is 60° and, accordingly, the conduction interval of said positive and negative neutral transistor subsequently conductive immediately thereafter is also 60°.

5. The method as defined in claim 2 wherein n, the electrical separation between phase to neutral voltages is 120° and the conduction angle of each controlled rectifier of said positive and negative set is 60° and the respective immediate conduction interval of said positive and negative neutral transistor is 60°.

6. The method as defined by claim 2 wherein said source comprises a three phase a.c. source thereby defining n equal to 120° and wherein the firing angle at which a controlled rectifier is rendered conductive is measured from a positive crossover point of the line to neutral voltages of the a.c. source, and wherein the firing angle of said positive set of controlled rectifiers is selectively variable from 90° to 120° followed by a conduction period of 60° and the firing angle of said positive neutral controlled rectifier accordingly varies from 150° to 180° followed by a conduction period of 60°.

7. The method as defined by claim 2 wherein said source comprises a three phase a.c. source wherein n is equal to 120° and wherein the firing angle at which a controlled rectifier is rendered conductive is measured from a positive crossover point of the line to neutral voltages of the a.c. source and wherein the firing angle of said positive set of controlled rectifiers is selectively variable from 90° to 120° and said firing angle of said positive neutral controlled rectifier occurs 60° later with both said rectifiers having mutual conduction periods of 60° providing a system which is adapted to provide improved response during voltage reversal.

8. The method as defined by claim 2 and wherein all of said controlled rectifiers have respective conductive intervals of 60° and wherein commutation from a neutral controlled rectifier to one controlled rectifier of said positive and negative set occurs on power reversal to a controlled rectifier of said positive set when rendered conductive.

* * * * *